United States Patent [19]

Jolivet et al.

[11] Patent Number: 5,897,892
[45] Date of Patent: Apr. 27, 1999

[54] MILK BASE ENRICHED IN CALCIUM AND ITS PREPARATION

[75] Inventors: Elise Jolivet, Oberwichterach; Luc Niesseron, Thun; Michael Schwan, Biglen, all of Switzerland

[73] Assignee: Nestec S.A., Vevey, Switzerland

[21] Appl. No.: 08/926,705

[22] Filed: Sep. 10, 1997

[30] Foreign Application Priority Data

Sep. 11, 1996 [EP] European Pat. Off. .............. 96202538

[51] Int. Cl.$^6$ .............................. A23K 1/175; A23C 3/02; A23C 3/023
[52] U.S. Cl. .......................... 426/74; 426/130; 426/399; 426/580; 426/590; 426/522
[58] Field of Search .............................. 426/74, 112, 580, 426/590, 399, 522, 130

[56] References Cited

U.S. PATENT DOCUMENTS

| | | | |
|---|---|---|---|
| 2,481,414 | 9/1949 | Grindrod et al. | 99/11 |
| 4,701,329 | 10/1987 | Nelson et al. | 426/74 |
| 4,840,814 | 6/1989 | Harada et al. | 426/580 |
| 4,851,243 | 7/1989 | Andersen et al. | 426/74 |
| 4,906,482 | 3/1990 | Zemel et al. | 426/74 |
| 4,910,026 | 3/1990 | Hugelshofer | 426/74 |
| 5,397,589 | 3/1995 | Korte et al. | 426/580 |
| 5,449,523 | 9/1995 | Hansen et al. | 426/42 |
| 5,500,232 | 3/1996 | Keating | 426/74 |
| 5,690,975 | 11/1997 | Akahoshi et al. | 426/34 |

FOREIGN PATENT DOCUMENTS

| | | |
|---|---|---|
| 88768 | 9/1982 | Australia . |
| 1086530 | 8/1960 | Germany . |
| 3719977 | 12/1988 | Germany . |

*Primary Examiner*—Nina Bhat
*Attorney, Agent, or Firm*—Vogt & O'Donnell, LLP

[57] ABSTRACT

A UHT-treated or sterilized or ultrapasteurized milk base product is obtained without the presence of thickening or gelling agents by adding calcium glycerophosphate and a calcium chelating agent to a milk base, the pH of the calcium-enriched milk base product is adjusted to a pH of between 6.6 to 7.2 and then the pH-adjusted product is subjected to UHT treatment and that product is packaged, or alternatively, calcium glycerophosphate and a chelating agent are added to water to obtain a mixture, the pH of the mixture is adjusted to a pH of between 6.6 to 7.2 to obtain a solution, the solution is heat-treated to sterilize it, and then the sterilized solution is metered into a milk base which has been sterilized or ultrapasteurized.

24 Claims, No Drawings

MILK BASE ENRICHED IN CALCIUM AND ITS PREPARATION

BACKGROUND OF THE INVENTION

The invention concerns the enrichment in calcium of a milk, a milk-based beverage or a dietetic product.

Calcium is an important element in the nutrition of mammals, in particular humans. Calcium is necessary for the formation of bones and the maintenance of their quality and is indispensable for metabolism.

Milk products, in particular milk, are an important source of calcium. Unfortunately, many people do not consume the quantity of milk necessary for their nutritional needs. One liter of milk generally contains approximately 1250 mg of calcium.

The enrichment in calcium of milk or of dietetic products having a composition similar to that of milk encounters technological problems when it is desired to manufacture non-acid liquid products, in particular long life products, for example ultra-pasteurized or sterilized products. In point of fact, many potentially useful calcium salts are soluble in water, so that the solution consisting of adding these salts directly to the raw material and then subjecting the mixture to heat treatment, in particular ultra-pasteurization or sterilization, is not generally possible, since this heat treatment leads to a finished product which is degraded from the point of view of physico-chemical stability and organoleptic properties. The addition of insoluble salts before heat treatment does not have the afore-mentioned disadvantages, but on the other hand these salts settle rapidly at the bottom of the package.

A solution to this problem is provided, for example, by the process according to European Patent Application Publication No. 0285795. It consists of adding thickening or gelling agents to a suspension of calcium salt, of heat treating the mixture and then aseptically metering it in a production line for a previously sterilized milk product.

The addition of calcium salts and polyphosphate to a whole milk before UHT treatment is known, for example, from Australian Patent Application No. 88768182. In this patent application, the addition of a calcium salt in the presence of polyphosphate aims at stabilizing the milk by preventing it gelling with time during storage.

SUMMARY OF THE INVENTION

The invention aims at providing a milk, a milk-based beverage or a dietetic product enriched in calcium, which is heat-treated, neutral and homogeneous and free from thickening or gelling agent and which does not have the afore-mentioned disadvantages.

Accordingly, the invention concerns a milk, a milk-based beverage or a dietetic product enriched in calcium, in liquid form and heat treated, characterized in that it contains a quantity of calcium in a soluble form at least 20% greater than that naturally contained in milk, which is free from a thickening or gelling additive, that its pH is close to the natural pH of milk and that it remains homogeneous without the well-known phase separation or adverse changes to the taste and storage during its keeping period.

The invention also concerns a process for enriching milk or a dietetic product with calcium, characterized in that the pH of a liquid milk base is adjusted, if necessary, to a value of between 6.6 and 7.2, in that a soluble calcium salt of an organic salt is added to it, and in that the mixture is then subjected to UHT treatment and packaged.

Alternatively, the present invention includes a further process, suited in particular to the case of an enrichment at a high level with calcium salts which are likely to react with the milk proteins under the conditions of a relatively stringent UHT heat treatment, wherein an aqueous suspension or solution is prepared with a calcium salt of an organic acid, in particular selected from calcium glycerophosphate, gluconate, and lactate, and/or of a calcium salt of an amino acid and mixtures thereof, its pH is adjusted to a value of between 6.6 and 7.2, the suspension or solution is heat treated and is then metered aseptically in-line into a previously sterilized or ultrapasteurized milk base.

No thickening or gelling additive need be present in the products of the invention or need be used in the processes of the invention.

DETAILED DESCRIPTION OF THE INVENTION

Within the context of the invention, milk is meant to be animal milk, from cows, sheep, goats or camels. It may be a vegetable milk, for example soya. A beverage or dietetic product is meant to be a product which is nutritional in nature and has a composition similar to that of milk, intended for feeding children, adolescents or adults.

A milk base may be a milk, preferably a semi-skimmed or skimmed milk, or a dietetic product with a composition similar to milk. Such a base may be a raw milk, a heat-treated milk, a bactofugated milk or a pasteurized milk. It may have been reconstituted by recombination from skimmed milk powder, anhydrous milk fats and water.

A milk of this type, a beverage containing such a milk or a dietetic product may be whole, semi-skimmed or skimmed, containing 0 to 3.6% by weight of fats.

The source of calcium consists of a calcium salt, the solubility of which at a neutral or close to neutral pH ensures the absence of crystallization in the milk or the dietetic product after heat treatment, as well as the absence of reactivity under heat-treatment conditions. When it is not soluble enough, it precipitates, forming a deposit. If, on the other hand, its solubility is too high, there is a risk of reaction between the free calcium and proteins leading to coagulation during heat treatment.

The calcium salt fulfilling the afore-mentioned conditions is preferably a salt of an organic acid selected from calcium glycerophosphate, gluconate and lactate, a calcium salt of an amino acid and mixtures thereof.

The enrichment in calcium corresponds to at least 20%, and preferably approximately 50% compared with the quantity naturally contained in the milk.

According to the desired degree of enrichment, the solubility of the calcium salt and the UHT treatment conditions, the salt or the mixture in question will represent preferably 0.3 to 0.9% by weight of the final milk product. For example, if the product is pasteurized, the quantity added may be greater than in the case of a more stringent ultra-pasteurization or sterilization.

If the gluconate is used, the preferred concentration is 0.6 to 0.9% by weight. For a mixture of gluconate and lactate, the preferred concentrations are 0.3 to 0.6% by weight for gluconate and <0.2% by weight for lactate.

A preferred amino acid salt consists of a pidolate or a pyroglutamate, its preferred concentration being 0.4 to 0.6% by weight.

According to a particularly preferred embodiment of the process, calcium glycerophosphate is added to the liquid product as a source of calcium in the presence of a calcium chelating agent. The calcium chelating agent of choice consists of a citrate salt of an alkali metal, including tripotassium citrate and preferably trisodium citrate.

Calcium glycerophosphate constitutes a preferred source for the enrichment in particular of a skimmed milk, in as much as it has the unexpected additional advantage of whitening the product, which overcomes the known disadvantage of the greenish coloration of low-fat milks which have been subjected to UHT treatment.

Use is preferably made of 0.3 to 0.5% by weight of glycerophosphate and 0 to 0.15% by weight of chelating agent.

EXAMPLES

The following examples illustrate the invention. In these, parts and percentages are by weight, unless indicated to the contrary.

Example 1

397 kg of skimmed raw milk were subjected to pasteurization at 85° C. for 10 s, and were then cooled to 40° C. 1.88 kg of calcium glycerophosphate, the solubility of which in cold water is 2%, and 0.58 kg of trisodium citrate were mixed with 20 kg of this raw material and the mixture was added to the remainder of the raw material. After adjusting the pH to 6.7 by adding 336 g of a 30% aqueous suspension of calcium hydroxide, the liquid was heated to 78° C. and was then ultrapasteurized by UHT with direct steam injection at 138° C. for 2 s. After cooling the liquid to 78° C. by flash expansion, it was homogenized in two stages at 150 bar and then at 50 bar, cooled to 4° C. and then packaged in brick packages, all the operations following ultrapasteurization taking place aseptically.

The calcium content was 2000 mg/l, which was the equivalent of an enrichment of approximately 65% with respect to the milk.

After 45 days storage in a refrigerated circuit, no phase separation was observed nor any adverse changes to the taste. In addition, the milk had a pure white colour, unexpected for a low-fat milk, which corresponded approximately to that of a milk with 2% fats.

Example 2

The procedure was as in example 1, except that 1.52 kg of glycerophosphate and 0.4 kg of trisodium citrate were used and the UHT treatment took place at 148° C. for 5 s.

The properties of the product obtained were the same as in example 1. The calcium content was 1850 mg/l, which corresponded to an enrichment of approximately 50% with respect to the milk.

Example 3

The procedure was as in example 1, using 0.35% of calcium gluconate. The calcium gluconate was added to the previously pasteurized milk and the pH of the mixture was adjusted with a solution of NaOH and/or Ca(OH)$_2$ and/or KOH to the natural pH of milk. The mixture was then ultra-pasteurized at 138° C. for 2 s, cooled to 4° C. and packaged aseptically.

Example 4

A skimmed raw milk was pasteurized at 85° C. for 10 s and the pH was then adjusted to 6.8 by adding an aqueous suspension of NaOH. The milk was reheated to 78° C. and ultrapasteurized by UHT at 138° C. for 2 s.

A 40% aqueous suspension of calcium gluconate was prepared separately and its pH was adjusted to 6.7 by adding a 30% aqueous suspension of NaOH and/or Ca(OH)$_2$ and/or KOH. The suspension was heat treated and then metered in a hygienic manner into the previously ultrapasteurized milk, so that the gluconate content corresponded to 0.65% in the final product.

The mixture was cooled and packaged hygienically in brick packages.

The product obtained contained 1800 mg of calcium per liter, which corresponded to an enrichment of 44% with respect to the milk.

Example 5

The milk base, which consisted of a milk with 1.5% fats, was sterilized by UHT at 148° C. for 5 s.

The procedure was as in example 4, with a source of calcium consisting of an aqueous solution of calcium lactate/gluconate, the concentration of which corresponded to 38% at 90° C., and the pH was adjusted to 6.7, it was heat treated and then metered aseptically into the sterilized milk base, so that the lactate content was 0.2% and that of the gluconate was 0.325% in the final product.

The mixture was cooled to 4° C. and then packaged hygienically in brick packages.

The product obtained contained 1800 mg of calcium per liter, which corresponded to an enrichment of approximately 44% with respect to the milk.

Example 6

The procedure was as in example 4, with a source of calcium consisting of a 40% aqueous suspension of pidolate (pyroglutamate) in a quantity corresponding to a concentration of 0.45% in the final product, all other conditions of the process being identical.

The product obtained contained 1800 mg of calcium per liter, which corresponded to an enrichment of approximately 44% with respect to the milk.

We claim:

1. A UHT-treated or ultrapasteurized or sterilized milk product comprising a milk base containing constituents of calcium glycerophosphate in solution and constituents of a chelating agent in solution wherein based upon the milk product weight, the calcium glycerophosphate constituents are an amount, by dry weight, of from 0.3% to 0.9% and the chelating agent constituents are present and in an amount, by dry weight, of up to 0.15%.

2. A milk product according to claim 1 wherein the milk product does not contain an added thickening or gelling agent.

3. A milk product according to claim 1 wherein the calcium glycerophosphate constituents are in an amount of from 0.3% to 0.5%.

4. A milk product according to claim 1 wherein the chelating agent is selected from the group consisting of trisodium citrate and tripotassium citrate.

5. A milk product according to claim 1 wherein the milk base is a skimmed milk.

6. A process for obtaining a UHT-treated milk product enriched with calcium comprising adding calcium glycerophosphate and a calcium chelating agent to a milk base to obtain a calcium-enriched milk base having an amount of calcium at least 20% greater than a calcium amount contained by the milk base, adjusting the pH of the enriched milk base to a pH of between 6.6 to 7.2 to obtain a pH-adjusted product, subjecting the pH-adjusted product to UHT treatment to obtain a UHT-treated calcium-enriched milk product and packaging the enriched milk product.

7. A process according to claim 6 wherein no thickening or gelling agent is added to the milk base, to the enriched milk base or to the pH-adjusted product prior to the heat treatment so that the enriched milk product packaged is free of added thickening and gelling agents.

8. The enriched milk product of claim 7.

9. A process according to claim 6 wherein the calcium chelating agent is selected from the group consisting of trisodium citrate and tripotassium citrate.

10. A process according to claim 6 wherein, by weight based upon the enriched milk product weight, the calcium glycerophosphate is added to the milk base in an amount of from 0.3% to 0.9%.

11. A process according to claim 10 wherein the amount of calcium glycerophosphate is from 0.3% to 0.5% and the chelating agent is added in an amount so that the constituents of the chelating agent are present in the enriched milk product in an amount, by dry weight, of up to 0.15%.

12. The enriched milk product of claim 10.

13. A process according to claim 6 wherein the milk base is a skimmed milk.

14. The enriched milk product of claim 13.

15. The enriched milk product of the process of claim 6.

16. A process for obtaining a sterilized or ultrapasteurized milk product enriched with calcium comprising adding calcium glycerophosphate to water to obtain a mixture and adjusting the pH of the mixture to a pH of between 6.6 to 7.2 to obtain a solution, heat treating the solution to obtain a sterilized solution and preparing the mixture and solution and metering the sterilized solution into a milk base selected from the group consisting of a sterilized milk base and an ultrapasteurized milk base to obtain a calcium-enriched milk product so that the enriched milk product contains an amount of calcium at least 20% greater than a calcium amount contained by the milk base.

17. A process according to claim 16 wherein no thickening or gelling agent is present in the solution and is not added to the milk base so that the enriched milk product is free of added thickening and gelling agents.

18. The enriched milk product of claim 17.

19. A process according to claim 16 further comprising a calcium chelating agent.

20. A process according to claim 16 wherein the sterilized solution is prepared and the calcium glycerophosphate and water are added in amounts so that, based upon the enriched milk product weight, the constituents of calcium glycerophosphate are present in solution in the enriched milk product in an amount, by dry weight, of from 0.3% to 0.9%.

21. The enriched milk product of claim 20.

22. A process according to claim 16 wherein the milk base is a skimmed milk.

23. The enriched milk product of claim 22.

24. The enriched milk product of claim 16.

* * * * *